UNITED STATES PATENT OFFICE 2,661,338

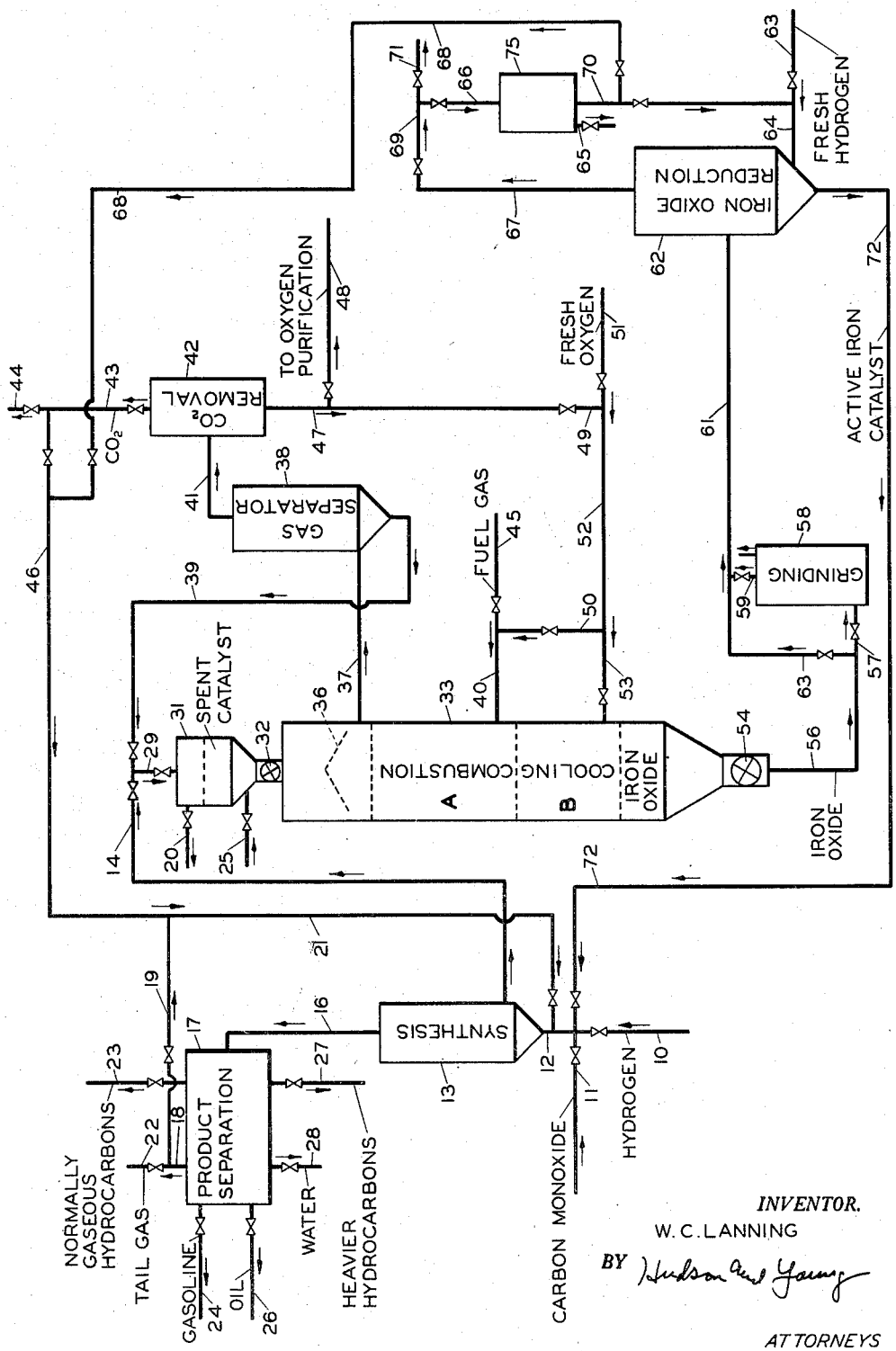

REGENERATION OF A FISCHER-TROPSCH REDUCED IRON CATALYST

William C. Lanning, Bartlesville, Okla., assignor to Phillips Petroleum Company, a corporation of Delaware Application December 13, 1948, Serial No. 64,958

3 Claims. (Cl. 252—417)

This invention relates to the synthesis of hydrocarbons and oxygen-containing materials from carbon monoxide and hydrogen, in the presence of a catalyst. In one aspect this invention relates to the regeneration of a catalyst at least partially spent in a catalytic process for the synthesis of hydrocarbons and oxygen-containing compounds, from carbon monoxide and hydrogen.

In a process of the Fischer-Tropsch type, carbon monoxide is hydrogenated in the presence of a catalyst to form hydrocarbons and oxygenated compounds. In this type of process, operation with a fluidized catalyst is most preferably employed. When so operating, feed gas comprising hydrogen and carbon monoxide is passed into the bottom of an elongated vertical reactor, and upwardly through a mass of finely divided catalytic material maintained at the desired synthesis reaction temperature. The velocity of the influent gas maintains the catalytic material in a fluidized condition with the effluent gas being relatively catalyst-free.

During the course of the synthesis reaction, carbonaceous material comprising heavy wax-like product and/or carbon, accumulates on the catalyst surface until it impairs the activity of the catalyst to such an extent that removal of the carbonaceous matter is necessary. Unless the carbonaceous matter deposited on the catalyst is removed, a point is reached at which the catalyst is no longer useful, and generally must be discarded. Such practice is uneconomical in view of the fact that new catalyst must constantly be provided to replace the inactive catalyst withdrawn from the process.

In accordance with practice known to the art, when carbonaceous matter is accumulated on the catalyst to impair its activity, in a process of the type being discussed, it is treated in a regeneration step conducted either in situ, or in a separate regeneration vessel. In the latter instance, it is common practice to continuously withdraw a catalyst side stream from the synthesis chamber and to pass the withdrawn catalyst to a separate regeneration zone, regenerating the catalyst therein and returning activated catalyst thus formed to the synthesis chamber. By such practice the activity of the catalyst in the synthesis chamber is maintained at a constant level and the synthesis progresses wthout interruption.

This invention is concerned with a new and novel method for regenerating iron catalysts, which become at least partially spent during the catalytic synthesis of hydrocarbons and oxygen-containing compounds from carbon monoxide and hydrogen. When using the term "at least partially spent" it is meant herein, catalyst on which is deposited carbonaceous matter to a degree that the catalyst is less active as a result of the presence of the carbonaceous material, or is completely inactive as a result thereof. A catalyst, at least partially spent, may, therefore, be one having only slightly decreased activity or it may be a completely inactive catalyst; or it may have an activity within the range of those two extremes, depending upon the extent of deposition of carbonaceous materials on its surface.

An object of this invention is to provide a continuous catalytic process for the synthesis of hydrocarbons and oxygenated compounds from carbon monoxide and hydrogen.

Another object is to provide for the regeneration of a fluidized iron catalyst employed in the catalytic synthesis of hydrocarbons and oxygenated compounds from carbon monoxide and hydrogen.

Another object is to provide a process for the catalytic hydrogenation of carbon monoxide wherein hydrocarbons and oxygenated compounds are produced in the presence of a catalyst having a constant activity level, maintained by continuously withdrawing a portion of catalyst, at least partially spent, from the synthesis zone, regenerating the withdrawn catalyst and returning iron catalyst thus activated to the synthesis.

Other objects will be apparent, to those skilled in the art, from the accompanying discussion and disclosure.

In accordance with a preferred embodiment of this invention, hydrocarbons and oxygen-containing compounds are synthesized from carbon monoxide and hydrogen in the presence of a fluidized iron catalyst, in a process wherein catalyst, at least partially spent, in the synthesis zone as the result of deposition thereon of carbonaceous product materials, is withdrawn from the synthesis zone and passed to a separate regeneration zone, reactivated therein and returned to the synthesis. Fluidized iron synthesis catalyst laden with carbonaceous material and withdrawn from the synthesis zone is introduced at a controlled rate into a regeneration chamber, or furnace, through a feeder which drops the catalyst material on slots for uniform distribution in an upper portion of the regeneration chamber. In this chamber it is contacted in countercurrent flow, at a rate not exceeding substantially free settling conditions, with excess oxygen, or a suitable oxygen-containing gas, at a temperature at which the carbonaceous deposits on the surface of the catalyst are oxidized to gaseous oxides, and at which concomitantly formed iron oxide is fused. Droplets of molten iron oxide are passed on downwardly through a portion of the regeneration zone below the upper portion already discussed, under substantially free settling conditions, in countercurrent flow and heat exchange relation with oxygen introduced below, at a temperature lower than the fusion temperature of iron oxide, causing the iron oxide droplets to solidify. The solid iron oxide particles thus formed are removed from the regeneration zone, and reduced by hydrogen to form reactivated fluidized iron catalyst, of the original particle size, which is then recycled to the synthesis zone.

In another embodiment I may utilize an oxygen-containing gas, often air, and conduct the combustion in the regeneration zone without fusing the concomitantly formed iron oxide. This embodiment, i. e., operating without fusing the iron oxide, is less preferable than that already discussed, although it provides for removal of the carbonaceous matter from the catalyst surface without requiring rigid control of process conditions, i. e., ferric oxide or ferrosic oxide is formed over a broad temperature range and is easily reduced.

In order to more clearly illustrate my invention, reference is made to the following description and to the figure, in which one method of operating my process will be specifically disclosed. The figure is a flow diagram which diagrammatically illustrates one form of apparatus in which my process may be practiced. It is to be understood that the flow diagram is diagrammatic only and may be altered in many respects by those skilled in the art and yet remain within the intended scope of my invention.

Referring then to the figure, hydrogen from line 10 and carbon monoxide from line 11 are admixed in line 12 in a hydrogen to carbon monoxide mole ratio within the range of 1.7:1 to 2.3:1, preferably about 2:1, and the resulting admixture is introduced into the lower portion of synthesis zone 13 which contains a promoted iron catalyst having a mesh size within the limits of 80 to 400 mesh, at a space velocity within the limits of 1500 to 3500 standard gas volumes per catalyst volume per hour. Under such conditions of catalyst particle size and space velocity, the catalyst in zone 13 is maintained in a fluidized, dense-phase suspension. Synthesis zone 13 is maintained at a temperature within the limits of 560 to 620° F. and at a pressure within the range of 5 to 30 atmospheres. Total effluent from zone 13 is passed through line 16 to product separation means 17 comprising coolers, separators, distillation equipment, storage tanks and the like, not individually illustrated, which can be used to effect a separation of various selected product fractions introduced from line 16. The total product in line 16 contains a large amount of hydrocarbons along with a smaller amount of oxygenated compounds and a large amount of water. Tail gas comprising hydrogen, carbon monoxide and carbon dioxide is withdrawn from zone 17 through line 18 and recycled to synthesis zone 13 through lines 19, 21 and 12, or withdrawn in part or in whole, as desired, through line 22. The preferred mole ratio of recycled tail gas to fresh gas charge is usually within the range of 2:1 to 5:1. A normally gaseous hydrocarbon stream is withdrawn from zone 17 through line 23. A gasoline stream is withdrawn from zone 17 through line 24 and a heavier hydrocarbon stream, i. e., product boiling above approximately 400° F., is withdrawn through line 26. Wax and other heavy materials are withdrawn from zone 17 through line 27. Water is withdrawn through line 28.

During the operation of the synthesis step in zone 13, high molecular weight wax and wax-like products and/or carbon accumulates on the catalyst surface and after a period of time such an accumulation is so great as to impair fluidization of the catalyst and to cause the catalyst activity to decrease to an undesirably low level. In order to maintain a desired level of catalyst activity and a constant state of catalyst fluidization in synthesis zone 13, a continuous catalyst side stream may be passed from zone 13 through lines 14 and 29 to hopper 31 containing catalyst at least partially spent in zone 13 to be regenerated in regeneration zone 33. Catalyst withdrawn from zone 13 in this manner often carries with it small quantities of valuable relatively volatile material that may be recovered ahead of the regeneration in zone 33. This may be done by flushing the catalyst zody in zone 31 with an inert flushing gas such as steam, flue gas or the like, introduced into hopper 31 through line 25. Flushing gas containing relatively volatile product may then be removed from zone 31 through line 29. Partially spent catalyst from hopper 31 is passed at a controlled rate by means of star wheel feeder 32 into regeneration zone 33. Catalyst material from feeder 32 is dropped on to perforate distributor plate 36. By means of distributor plate 36 and star valve 32 the rate of flow of catalyst material through regeneration zone 33 is controlled so that flow of catalyst particles is within the range of substantially free settling conditions. Catalyst materials flow uniformly downwardly from plate 36 in countercurrent flow relation through combustion section A positioned in an upper portion of regeneration zone 33, with oxygen, at a temperature at which carbonaceous matter on the catalyst surface is converted to gaseous oxides, and iron oxide concomitantly formed is fused. Gaseous oxides thus formed are withdrawn from regeneration zone 33 through line 37 and passed to gas separator 38, wherein any entrained solid iron oxide materials are separated from the gas. Solid iron oxide particles separated in zone 38, are passed through lines 39 and 29 to hopper 31 and then returned to zone 33. Gas from zone 38 is passed through line 41 to carbon dioxide removal system 42 comprising various absorption steps, known to those skilled in the art, suitable for removing carbon dioxide from zone 38 effluent. Zone 42 may comprise an ethanolamine absorption system, well known to those skilled in the art, wherein carbon dioxide is absorbed in ethanolamine and subsequently removed in a separate stripping zone. In such an instance, unreacted oxygen present in the gas entering zone 42 remains unabsorbed and is recovered substantially free of carbon dioxide. Carbon dioxide from zone 42 may be withdrawn through lines 43 and 44 to further utilization, not shown. However, if desired, carbon dioxide from line 43 may be recycled through lines 46, 21 and 12 to synthesis zone 13. Carbon dioxide-free gas from zone 42, comprises unreacted oxygen in a major proportion, together with small amounts of nitrogen and carbon monoxide, and is withdrawn from zone 42 through line 47, and passed in whole or in part, as desired, through line 48 to oxygen purification means, not shown. Preferably, however, all or at least a part of gaseous material from line 47 is passed through line 49 and admixed in line 52 with fresh oxygen or a fresh oxygen-containing gas from line 51. The resulting oxygen-containing admixture in line 52 comprises preferably from 50 to 90 per cent or more of oxygen, and is introduced through line 53 into cooling section B of regeneration zone 33, subjacent combustion section A, already described, at a temperature usually from about 50 to 700° C. The temperature of the oxygen-containing gas thus introduced into zone 33 is below that at which iron oxide, concomitantly formed in combustion section A of zone 33, exists in the molten state. Oxygen-containing gas, introduced from line 53 into cooling section B of zone 33, passes upwardly therein in countercurrent flow and in heat exchange relation with molten iron oxide flowing downwardly at a rate not exceeding substantially free settling conditions. Operating in this manner, the molten iron oxide droplets are cooled by the oxygen-containing gas rising through cooling section B, and solid iron oxide particles of a size equivalent to the original iron catalyst particles are formed, and collect in the bottom of zone 33. Iron oxide particles thus formed accumulate in the bottom of zone 33, forming a gas seal therefor, and are withdrawn at a controlled rate through star wheel feeder valve 54 and passed through line 56 to an iron oxide reduction step. In some instances, depending upon whether or not free settling conditions of the liquid oxide droplets are generally exceeded, or are so closely approached that some individual particles exceed such rates, a limited amount of agglomeration may take place. In such cases, it may be desirable to grind the iron oxide material in line 56 to the desired mesh size for ultimate use in zone 13, although generally, agglomeration does not take place, and grinding is not required. When it is necessary to regrind the iron oxide particles, material from line 56 is passed through line 57 to grinding means 58. Iron oxide of the desired mesh size is withdrawn from grinding zone 58 through line 59 and passed through line 61 to iron oxide reduction zone 62. However, in most instances grinding is unnecessary and under those conditions, iron oxide from line 56 is passed around grinding zone 58 through lines 63 and 61 to reduction zone 62. In zone 62, iron oxide is reduced to iron with hydrogen introduced from lines 63 and 64, admixed when desired with recycled hydrogen from line 70, described hereafter, at a temperature usually within the range of about 315 to 485° C. Iron oxide reduction product from zone 62 comprises appreciable amounts of iron and some iron oxide. Off gas from iron oxide reduction zone 62 comprises primarily hydrogen and steam, which may be withdrawn through line 67 and passed through lines 69 and 66 to water removal zone 75, usually a cooling step wherein water condensate is formed, and removed from recycled gas introduced from line 66. Water-free recycled hydrogen gas is then passed from zone 75 through lines 70 and 64 to zone 62. However, if desired, all or a portion of the gas in line 70 may be passed to synthesis zone 13 through lines 68, 46, 21 and 12. Off gas in line 69 may be withdrawn through line 71 when desired to further utilization, not shown. Water may be withdrawn from zone 75 through line 65. Fluid activated iron catalyst suitable for utilization in synthesis zone 13 is withdrawn from iron oxide reduction zone 62 through line 72 and recycled to synthesis zone 13 through line 12 in admixture with fresh feed and recycled tail gas, introduced as already described.

When initiating operation in zone 33, combustion zone A may be brought to temperature by first burning a gas combustion mixture therein, introduced through line 40, comprising fuel gas from line 45 and oxygen, or an oxygen-containing gas, from lines 52 and 50. Subsequent to developing the desired temperature in combustion section A of zone 33, the flow of the gas combustion mixture through line 40 may be terminated or lessened, and the temperature therein at least partly sustained by the burning of carbonaceous matter in the presence of oxygen, already discussed. Temperatures in the combustion section are often as high as from 1500–1600° C., usually within the range from 1400–1700° C.

The minimum amount of oxygen introduced into zone 33 through line 53 is that quantity sufficient to burn all carbonaceous matter deposited on the catalyst surface, and to oxidize all iron to iron oxide, the latter oxidation taking place concomitantly. However, the total amount of oxygen introduced through line 53 is generally from 5 to 15 per cent above the minimum amount discussed above, to insure complete oxidation of carbonaceous matter and iron catalyst at all times.

When air is employed as the oxygen-containing gas in the practice of my invention, some ferric oxide may be formed along with magnetic iron oxide, whereas when oxygen or an oxygen-rich gas is employed and the oxide is fused, magnetic iron oxide is formed. The magnetic iron oxide, upon reduction, provides an activated iron catalyst having an activity higher than that of the ferric oxide reduction process.

For convenience and clarity certain apparatus such as pumps, surge tanks, accumulators, valves etc. have not been shown in the drawing. Obviously such modifications of the present invention may be practiced without departing from the scope of the invention.

Any fluid iron catalyst employed in the synthesis of hydrocarbons and oxygenated compounds by the catalytic hydrogenation of carbon monoxide, when at least partially spent during the synthesis as a result of carbonaceous deposits accumulated thereon, may be regenerated in accordance with my invention. Although iron alone may be used as a catalyst in the synthesis of hydrocarbons and oxygenated compounds from carbon monoxide and hydrogen, promoted iron catalysts are generally employed. Such promoters may be, for example, alkali metals or alkaline earth metals or their oxides, thoria, or various other materials. Among the promoters more generally utilized are potassium oxide, calcium oxide, and aluminum oxide. Very slight loss of promoter, if any at all, occurs when regenerating fluidized promoted iron catalyst in accordance with my invention.

As will be evident to those skilled in the art various modifications can be made or followed in the light of the foregoing disclosure and discussion, without departing from the spirit or scope of the disclosure or from the scope of the claims.

I claim:

1. In the regeneration of a particulate iron catalyst containing a metal oxide promoter and having a mesh size within the limits of 80 and 400 employed in the conversion of carbon monoxide and hydrogen to hydrocarbons and oxygen-containing compounds and at least partially spent by deposition thereon of carbonaceous matter during said conversion, wherein said spent catalyst is freed of carbonaceous matter by oxidation and said iron is concomitantly oxidized, and wherein magnetic iron oxide thus formed is subsequently reduced to metallic iron, the improvement in freeing said catalyst of carbonaceous matter deposited thereon comprising introducing such spent catalyst into an upper section of a regeneration zone of sufficient length to permit oxidation of carbonaceous matter and of iron, fusion of iron oxide, and solidification of iron oxide as herein subsequently set forth and therein contacting same at a temperature within the limits of 1400–1700° C. in countercurrent flow relation under free settling conditions with an upwardly flowing gas containing at least 80% oxygen introduced through a section of said regeneration zone subjacent said upper section whereby carbonaceous matter on the catalyst surface is burned to form gaseous oxides and the iron is completely converted to magnetic iron oxide and whereby magnetic iron oxide concomitantly formed is fused to form unagglomerated liquid droplets, withdrawing combustion gas from said regeneration zone, and passing droplets of fused magnetic iron oxide downwardly through said subjacent section under free settling conditions in countercurrent flow and in heat exchange relation with said gas containing oxygen introduced into said subjacent section at a temperature of 50–700° C. and to be contacted with catalyst in said upper section, whereby said droplets are cooled and form unagglomerated solid magnetic iron oxide particles.

2. The method of removing carbonaceous matter deposited on the surface of a fluidizable iron catalyst which has become spent in the synthesis of hydrocarbons from carbon monoxide and hydrogen, which method comprises contacting said catalyst, in a regeneration zone, in countercurrent flow relation under free settling conditions, with upwardly flowing oxygen in sufficient amount and at a temperature sufficiently high to support combustion of said carbonaceous matter and to oxidize the iron substantially completely, whereby magnetic iron oxide is concomitantly formed and whereby said oxide is fused to form unagglomerated liquid droplets, passing molten iron oxide thus formed downwardly in said zone in countercurrent flow and heat exchange relation with oxygen at a temperature lower than the solidification temperature of said oxide to cool same and form solid magnetic iron oxide particles free of said carbonaceous matter, said regeneration zone being of sufficient length to permit combustion of carbonaceous matter, oxidation of iron, and solidification as aforesaid, and recovering said solid magnetic iron oxide particles.

3. In the regeneration of a fluidizable iron catalyst employed in the conversion of carbon monoxide and hydrogen to hydrocarbons and oxygen-containing compounds and at least partially spent by deposition thereon of carbonaceous matter during said conversion, said catalyst having a particle size not greater than 80 mesh, wherein such spent catalyst is freed of carbonaceous matter by oxidation and the iron is oxidized and wherein magnetic iron oxide thus formed is subsequently reduced to metallic iron, the improvement which comprises introducing such spent catalyst into an upper part of a regeneration zone of sufficient length to permit oxidation of carbonaceous matter and iron, fusion of oxide, and solidification of oxide as subsequently set forth, countercurrently contacting said catalyst, in said zone, under free settling conditions, with an upwardly flowing gas containing at least 50 per cent oxygen introduced into a lower part of said zone in sufficient amount to remove said carbonaceous matter and completely oxidize said iron, whereby magnetic iron oxide is concomitantly formed and whereby said magnetic oxide is fused to form unagglomerated liquid droplets, and passing said fused magnetic oxide downwardly under free settling conditions through said lower part of said zone countercurrently to said gas, which is introduced into said lower part at a temperature lower than the solidification temperature of said magnetic oxide, whereby said magnetic oxide is cooled to form solid fluidizable magnetic iron oxide particles, and recovering said solid iron oxide.

WILLIAM C. LANNING.

References Cited in the file of this patent

UNITED STATES PATENTS

| Number | Name | Date |
|---|---|---|
| 2,015,053 | Freeman | Sept. 17, 1935 |
| 2,030,627 | Freeman | Feb. 11, 1936 |
| 2,038,251 | Vogt | Apr. 21, 1936 |
| 2,040,682 | Bacon et al. | May 12, 1936 |
| 2,365,720 | Neighbors | Dec. 26, 1944 |
| 2,420,049 | Martin | May 6, 1947 |
| 2,438,584 | Stewart | Mar. 30, 1948 |
| 2,455,419 | Johnson | Dec. 7, 1948 |
| 2,467,803 | Herbst | Apr. 9, 1949 |
| 2,477,454 | Heath | July 26, 1949 |
| 2,483,850 | Segura | Oct. 4, 1949 |
| 2,488,150 | Walden et al. | Nov. 15, 1949 |